United States Patent [19]

Kakigi

[11] 4,085,364

[45] Apr. 18, 1978

[54] CIRCUIT FOR SETTING TRANSMISSION AND RECEPTION FREQUENCIES

[75] Inventor: Takao Kakigi, Kawasaki, Japan

[73] Assignee: Cybernet Electronic Corporation, Kawasaki, Japan

[21] Appl. No.: 717,460

[22] Filed: Aug. 24, 1976

[30] Foreign Application Priority Data

Aug. 28, 1975 Japan ............................ 50-118271[U]
Aug. 28, 1975 Japan ............................ 50-118272[U]
Aug. 28, 1975 Japan ............................ 50-118273[U]

[51] Int. Cl.² ............................................. H04B 1/40
[52] U.S. Cl. ...................................... 325/20; 331/158
[58] Field of Search ................... 325/18, 19, 20, 21, 325/22, 17, 25; 331/154, 158; 343/175, 181

[56] References Cited

U.S. PATENT DOCUMENTS

| | | | |
|---|---|---|---|
| 3,339,140 | 8/1967 | Pace | 325/21 |
| 3,543,053 | 11/1970 | Mustain | 307/254 |
| 4,009,451 | 2/1977 | Moore et al. | 325/20 |

*Primary Examiner*—Benedict V. Safourek
*Attorney, Agent, or Firm*—Oblon, Fisher, Spivak, McClelland & Maier

[57] ABSTRACT

A circuit for setting transmission and reception frequencies having a crystal-controlled oscillation circuit with a quartz oscillator, a plurality of capacitors different in capacity connected to the quartz oscillator, switching transistors connected to the capacitors respectively, and a change-over switch for selectively actuating the switching transistors.

1 Claim, 1 Drawing Figure

U.S. Patent    April 18, 1978    4,085,364
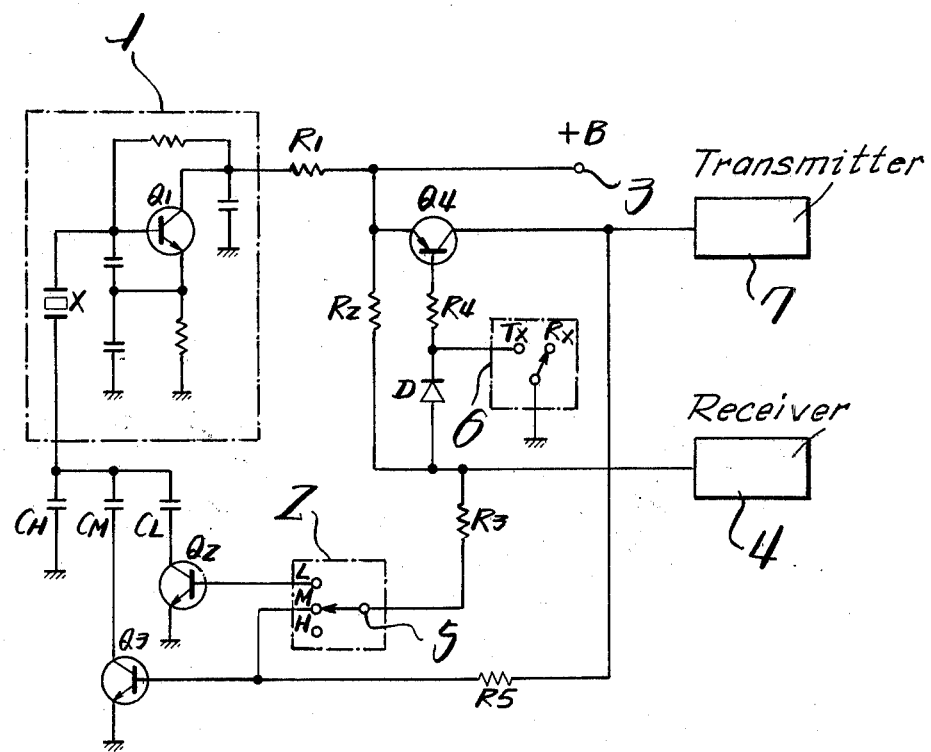

CIRCUIT FOR SETTING TRANSMISSION AND RECEPTION FREQUENCIES

BRIEF SUMMARY OF THE INVENTION

This invention relates to a circuit for setting transmission and reception frequencies.

When the transmission frequency is slightly out of phase with the set value in an electrical apparatus such as a transceiver, satisfactory results cannot be generally obtained if signals are received by the receiver with the set value of the reception frequency as the center frequency. Therefore, the conventional receiver is arranged so that it can adjust the reception frequency in itself. For this purpose, a plurality of capacitors are connected to a local oscillation circuit so that the oscillation frequency of the local oscillation circuit can be changed by shifting the connections of the circuit to these capacitors. However, such as arrangement is not stable in operation because of difficulty in positioning the change-over switch in proximity of these capacitors and of frequency changes due to stray capacity of wiring, mutual capacity between wires, etc. Furthermore, in a transceiver, such problems occur not only in reception but also in transmission. In addition, when a transceiver adapted to use the same crystal oscillator circuit both in transmission and reception is set to a transmission state, it is required for the transceiver to use the center frequency for transmission irrespective of the setting of the receiver side. Moreover, the power supply circuit for selectively supplying power to the transmitting and receiving circuits inevitably becomes a complicated circuit having a plurality of combined transistors.

Therefore, it is an object of the present invention to provide a circuit for setting transmission and reception frequencies capable of making fine adjustment of the reception frequency.

It is another object of the present invention to provide a circuit for setting transmission and reception frequencies which can be set to the center frequency during transmission without fail.

It is still another object of the present invention to provide a simple power supply circuit capable of selectively supplying power to the transmitting and receiving circuits.

According to the present invention, there is provided a circuit for setting transmission and reception frequencies which comprises a crystal-controlled oscillation circuit with a quartz oscillator, a plurality of capacitors different in capacity connected to the quartz oscillator, switching transistors connected to the above-mentioned capacitors respectively, and a change-over switch for selectively operating the switching transistors. In such an arrangement, the quartz oscillator of the crystal-controlled oscillation circuit, capacitors connected to the quartz oscillator, and the transistors connected to the capacitors can be positioned in extreme proximity to one another. Therefore, the stray capacity of wiring, mutual capacity between wires, etc. can be minimized even if the change-over switch is provided at a remote position, and thereby the frequency change during adjustment can be minimized and operation can be made reliable.

BRIEF DESCRIPTION OF THE DRAWING

The above and other objects, features and advantages will become more apparent from the following detailed description taken in conjunction with the accompanying drawing in which:

The single FIGURE is a circuit diagram showing a preferred embodiment of the present invention.

DETAILED DESCRIPTION

Now the present invention will be hereinafter described in detail with reference to the drawing.

Reference numeral 1 designates a crystal-controlled oscillation circuit formed as a Colpitts oscillator having a transistor $Q_1$ and a quartz oscillator X. Capacitors $C_H$, $C_M$ and $C_L$ are connected to the quartz oscillator X. The capacitor $C_H$ is grounded. The capacitors $C_M$ and $C_L$ are connected to the collectors of switching transistors $Q_2$ and $Q_3$, respectively, the emitters of which are grounded. The bases of the switching transistors $Q_2$ and $Q_3$ are connected to the change-over terminals L and M of a change-over switch 2, respectively.

Reference numeral 3 designates a DC power supply, to which the crystal-controlled oscillation circuit 1 is connected through a decoupling resistor $R_1$. The DC supply 3 is also connected to a transistor $Q_4$ for power change-over and a resistor $R_2$. The resistor $R_2$ is connected to a receiving circuit 4 and also to the common terminal 5 of the change-over switch 2 through a resistor $R_3$. The middle point of the connected line between the resistors $R_2$ and $R_3$ is connected through a diode D to a terminal $T_X$ of a press-to-talk switch 6 the common terminal of which is grounded. A terminal $R_x$ of the press-to-talk switch 6 is floated. The diode D is connected to the base of the transistor $Q_4$ through a resistor $R_4$. The collector of the transistor $Q_4$ is connected to a transmitting circuit 7, and also to the base of the transistor $Q_3$ through a resistor $R_5$.

The circuit thus constructed is operated as follows:

First, description will be made on the operation carried out when the press-to-talk switch 6 is at the position of the terminal $R_X$ and the change-over switch is at the position of the central terminal M. In this case, a positive voltage is applied to the base of the transistor $Q_4$, and therefore the transistor $Q_4$ is held at cutoff so as not to supply power to the transmitting circuit 7 from the power supply 3. However, power is supplied to the receiving circuit 4 from the power supply 3 through the resistor $R_2$. In addition, the transistor $Q_3$ is on, and the capacitor $C_M$ is grounded. Accordingly, the oscillation frequency of the crystal-controlled circuit 1 is set to the center frequency for reception. If the transmission frequency is out of phase, however, it is necessary to make the reception frequency coincide with the center of the transmission frequency. In this case, the change-over switch 2 is shifted to the position of terminal L or H. If the change-over switch is shifted to the position of terminal L, the transistor $Q_3$ will turn off and the transistor $Q_2$ will turn on and thereby the capacitor $C_L$ will be grounded. Thus the reception frequency will be shifted to take a slightly lower value. If the change-over switch 2 is shifted to the position of terminal H, both transistors $Q_2$ and $Q_3$ will turn off and therefore the reception frequency will be determined on the basis of the capacitor $C_H$. Thus the reception frequency will be shifted to take a slightly higher value.

Second, description will be made on the operation carried out when the press-to-talk switch 6 is shifted to the position of terminal $T_X$. In this case, the base voltage of the transistor $Q_4$ is lowered to turn on the transistor $Q_4$, and thereby power is supplied to the transmitting circuit 7 from the power supply 3 and, at the same time, power supply to the receiving circuit 4 is suspended. Since the transmitting circuit 7 is connected to the transistor $Q_3$ through the resistor $R_4$, the transistor $Q_3$ is also turned on. Thus the crystal-controlled oscillation circuit 1 is placed in a transmitting state and, at the same time, the transmission frequency is set to the center frequency. This operation is independent of the position of the change-over switch 2.

The circuit thus formed according to the present invention can extremely shorten the line from the quartz oscillator to each switching transistor, and therefore is free of troubles due to stray capacity of wiring, mutual capacity between wires, etc. even if the distance between the change-over switch and each switching transistor is great. Thus the circuit of the present invention can minimize the frequency shift during fine adjustment and can be reliably operated. In addition, in the transmitting state, power supply to the receiving circuit is suspended and power is supplied only to the transmitting circuit and, in addition, only the switching transistor for setting the center frequency is put in operation. Thus the transmission through the center frequency can be automatically carried out. Moreover, the power supply circuit is formed so that a change-over switch (i.e., a press-to-talk switch) may turn a transistor on and off thereby selectively actuating a transmitting circuit and a receiving circuit and so that the above functions may be reliably achieved by a very simple configuration including one transistor and one diode.

What is claimed is:

1. A circuit for setting transmission and reception frequencies comprising:

a transistor having an emitter, a collector and a base;

means for connecting the emitter of the transistor to a first polarity terminal of an external power supply;

change-over switch means for connecting and disconnecting the base of the transistor to and from a second polarity terminal of the external power supply to alternately bias the transistor conductive and non-conductive;

a transmitting circuit connected to the collector of the transistor, the transistor providing a path for current between the first polarity terminal of the external power supply and the transmitting circuit when the transistor is conductive;

a receiving circuit;

a diode having one end connected to the base of the transistor and the other end connected to the receiving circuit;

a resistor connected between the emitter of the transistor and the other end of the diode, the resistor providing a path for current between the first polarity terminal of the external power supply and the receiving circuit when the transistor is non-conductive;

an oscillator including a quartz crystal resonator;

means for connecting the oscillator to the first polarity terminal of the external power supply;

a plurality of capacitors connected to the quartz crystal resonator including a first capacitor for setting a center frequency of the oscillator;

means responsive to the biasing of the transistor conductive for delivering current from the first capacitor to the second polarity terminal of the external power supply to set the oscillation frequency of the oscillator at the center frequency; and means responsive to the biasing of the transistor non-conductive for delivering current from predetermined ones of the plurality of capacitors to the second polarity terminal of the external power supply to shift the frequency of the oscillator in a range about the center frequency.

* * * * *